H. OGBORN & A. W. KENDRICK,

Assignors, by mesne assignments, to THE C. T. SEGAR MANUFACTURING COMPANY.

BED BOTTOM.

No. 10,220. Reissued Oct. 24, 1882.

WITNESSES

Ellette Anderson.

Philip Cessasi.

INVENTORS

Andrew W. Kendrick

Harrison Ogborn.

by Anderson & Smith their ATTORNEYS

UNITED STATES PATENT OFFICE.

HARRISON OGBORN, OF RICHMOND, INDIANA, AND ANDREW W. KENDRICK, OF BROOKLYN, NEW YORK, ASSIGNORS, BY MESNE ASSIGNMENTS, TO THE C. T. SEGAR MANUFACTURING COMPANY, OF UTICA, NEW YORK.

BED-BOTTOM.

SPECIFICATION forming part of Reissued Letters Patent No. 10,220, dated October 24, 1882.

Original No. 135,725, dated February 11, 1873. Application for reissue filed September 6, 1882.

*To all whom it may concern:*

Be it known that we, HARRISON OGBORN and ANDREW W. KENDRICK, both citizens of the United States, residing respectively at Richmond and Brooklyn, in the counties of Wayne and Kings and States of Indiana and New York, have invented certain new and useful Improvements in Spring-Mattresses for Beds, of which the following is a specification, reference being had therein to the accompanying drawings.

Figure 1:
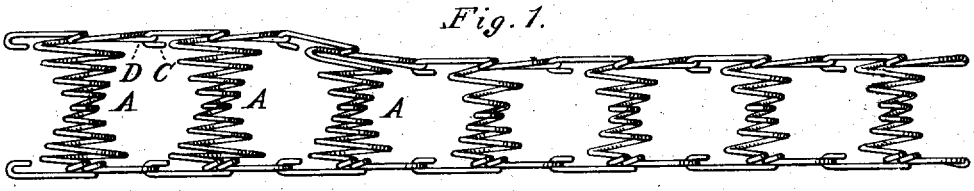
Figure 2:
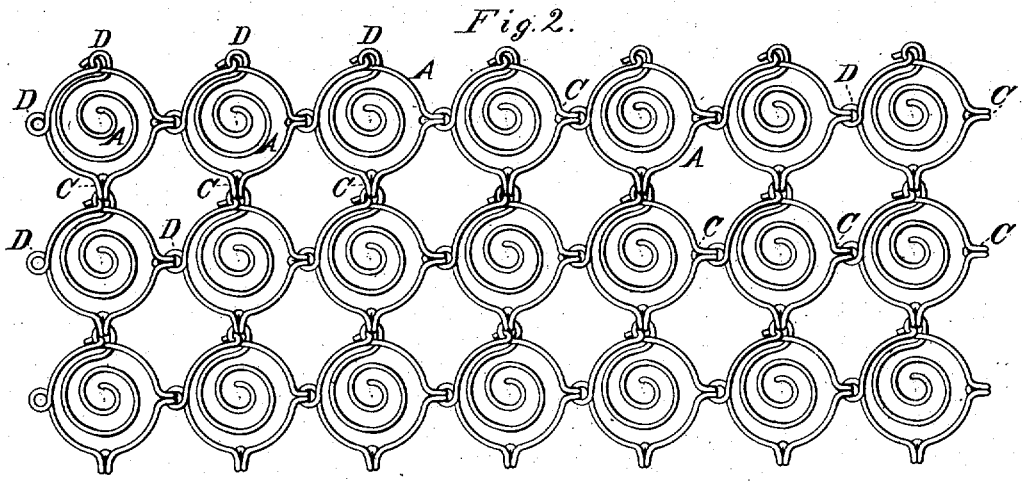
Figure 4:
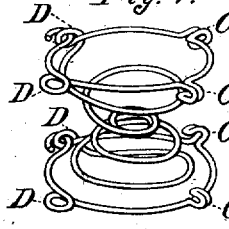
Figure 5:
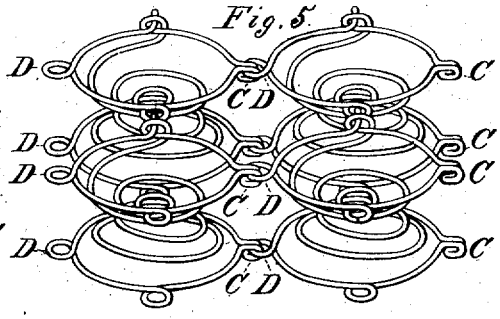
Figure 3:
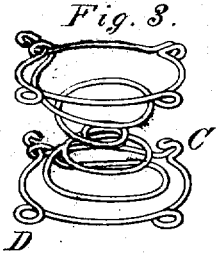
Figure 6:
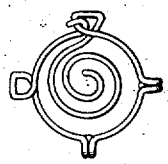
Figure 7:
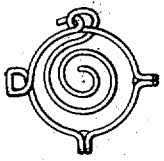

Figure 1 represents a side elevation of our spring-mattress complete; Fig. 2, a plan or top view thereof; Fig. 3, a perspective view of a modified form of a spring detached; Fig. 4, another view of a spring detached. Fig. 5 represents a group of four springs, composed of the modification shown in Fig. 3 and attached to each other by the hooks and eyes, hereinafter described. Figs. 6 and 7 represent modified methods of forming the eyes in the springs.

The object of our invention is to construct a spring-mattress, or mattress and bolster combined, composed entirely of metal springs, so that they may be securely and firmly attached to each other to form a soft, elastic, light, and noiseless mattress, or mattress and bolster combined, that may be used either side up, rolled together or bent in any desired shape to form a bed, and that it may be readily repaired or new springs inserted.

Our invention relates, first, to the peculiar manner of forming the eyes on the coils composing a spring-mattress and securing to the eye so formed the ends of the wire of which the springs are made to retain them in shape by hooks formed on the ends of the coil; second, in lengthening the springs of which the mattress is composed at one end so as to form a bolster to elevate the head.

A, Fig. 2, represents a top view of the springs, with their eyes and hooks, of our mattress.

D are eyes formed in the outside coils of the springs by crossing the wire to receive the hooks C on the sides of the adjacent springs, which hooks are formed as shown in the drawings. These eyes hold the ends of the wire of which the springs are composed, the ends of the wire having hooks formed on them, which are clasped permanently into the eyes to prevent the mattress sagging, inclining sidewise, or drawing apart.

As a modification of this mode of fastening the ends of the wire of which the springs are formed, it may be wrapped around the coils, commencing at one side and extending over and around the hook, which would be equivalent to a hook in the end thereof, thus uniting the springs and forming a durable and perfect mattress.

To form a combined mattress and bolster, one or more rows of springs at one end of the body of the mattress are made sufficiently long to elevate the head to the required height, as represented in the drawings.

These springs are specially adapted to sofas and chairs and wherever spring-seats are desired, because of the facility in the manufacture and their durability.

Having thus fully described our invention, what we claim, and desire to secure by Letters Patent, is—

1. A mattress the springs of which are formed with hooks and eyes of the last coils thereof when the ends of the wire forming the coils are secured to or around the eyes, substantially in the manner and for the purposes herein set forth.

2. A mattress constructed of the springs, as described, with a head or bolster elevation formed by graduating the springs at the head.

3. A wire spring having an eye, D, formed on its outer coil, secured to the end of the wire of which the spring is made to retain said spring in shape and prevent sagging, substantially as specified.

In testimony whereof we affix our signatures in presence of two witnesses.

ANDREW W. KENDRICK.
HARRISON OGBORN.

Witnesses for Kendrick:
OSCAR C. KLEINE, Jr.,
JACOB FUCHS.

Witnesses for Ogborn:
WM. H. OGBORN,
ESSIE OWEN.